United States Patent [19]

Crane

[11] 4,064,596
[45] Dec. 27, 1977

[54] APPARATUS FOR PROCESSING POULTRY

[75] Inventor: Edward J. Crane, Ottumwa, Iowa

[73] Assignee: Barker International, Inc., Marietta, Ga.

[21] Appl. No.: 663,304

[22] Filed: Mar. 3, 1976

[51] Int. Cl.² ............................................. A22C 21/02
[52] U.S. Cl. ................................................. 17/11.1 R
[58] Field of Search .................... 17/11.1 R, 18; 69/26

[56] References Cited

U.S. PATENT DOCUMENTS

| | | | |
|---|---|---|---|
| 3,235,904 | 2/1966 | Brown et al. | 17/11.1 R |
| 3,273,198 | 9/1966 | Tomlinson | 17/11.1 R |
| 3,277,515 | 10/1966 | Engkjer et al. | 17/11.1 R |
| 3,477,093 | 11/1969 | Zebarth et al. | 17/11.1 R |
| 3,585,675 | 6/1971 | Crane | 17/11.1 R |
| 3,959,850 | 6/1976 | Crane | 17/11.1 R |

Primary Examiner—Richard C. Pinkham
Assistant Examiner—Harry G. Strappello
Attorney, Agent, or Firm—Price, Heneveld, Huizenga & Cooper

[57] ABSTRACT

A poultry processing apparatus including an elongated enclosure defining a longitudinally extending channel through which fowl is moved via a conveyor for picking and removing the feathers therefrom. A plurality of picking members having resilient fingers for contacting the fowl and removing the feathers are provided on each side along the length of the enclosure. The opposed picking members mounted on opposed supporting frameworks, each include a plurality of vertical and horizontal adjustment mechanisms for adjusting the position of the picking members with respect to the line of travel of the flow on the conveyor. Special overhead mounting structures are provided for the supporting frameworks wherein the picking assemblies may be moved toward and away from the enclosure to allow access to the picking member, the interior of the enclosure and the interior of the supporting frameworks for clearing and maintenance.

22 Claims, 7 Drawing Figures

APPARATUS FOR PROCESSING POULTRY

BACKGROUND OF THE INVENTION

This invention relates to poultry processing apparatus and more particularly to poultry processing devices utilizing elongated, flexible, resilient picking fingers which contact and remove feathers from the poultry during movement through an enclosure on a continuously moving conveyor. Processing equipment of this type is known in the art and a system in which the present invention may be utilized is illustrated in commonly assigned U.S. Pat. No. 3,716,892, issued Feb. 20, 1973 entitled METHOD AND APPARATUS FOR PROCESSING POULTRY. As described therein, the apparatus for processing poultry includes a generally closed elongated enclosure having poultry entry and exit extremities. A conveyor running through the enclosure conveys the poultry along a predetermined path and picking means within the enclosure are positioned adjacent the path for contacting the birds as they are conveyed thereby and for removing the feathers therefrom. With respect to the actual picking operations, a typical fowl picking machine utilizing counter-rotating drums in which pairs of drums are mounted in individual assemblies for operating on the poultry as it passes therethrough is disclosed in commonly assigned application Ser. No. 493,023, filed July 30, 1974, now U.S. Pat. No. 3,959,850, issued June 1, 1976 entitled COUNTER-ROTATING FOWL PICKER. The apparatus disclosed therein includes opposing picking assemblies adjustable to accommodate fowl or poultry of various sizes.

Rotary drum-type poultry picking machines are known in the art. Since the specific details of construction of such picking assemblies are well known to those skilled in the art, they will not be described in greater detail. It is noted, however, that most prior mechanisms, although functionally adequate, were difficult to clean, repair and maintain. An advance in this respect is illustrated in the aforementioned applicaion Ser. No. 493,023 wherein cleaning, maintenance and repair was greatly facilitated by the provision for individual support of counter-rotating pairs of picking drums and by means of a cover member removable at the exterior of the housing to provide access to the interior of the drums. Typically, however, access to the individual drums for replacement of the flexible picking fingers, removal of accumulated feathers or other foreign materials, lubrication of bearings and the like has proven difficult.

SUMMARY OF THE INVENTION

Accordingly, it is the purpose of the present invention to provide a fowl picking machine in which the picking members including a plurality of picking fingers are mounted on a pair of opposed supporting frame members which are mounted for movement with respect to the main frame or enclosure to facilitate service, maintenance and repair operations.

The apparatus of the invention for picking fowls as they are conveyed along a predetermined path of travel comprises an elongated enclosure through which fowls are conveyed during the picking operation. The enclosure is opened at the ends to allow passage of the fowls and has openings formed in the side walls. A pair of opposed picking assemblies are positionable at the sides of the enclosure to extend through the openings into the enclosure. Each picking assembly includes a plurality of finger elements adapted to engage and remove the feathers from the fowl. The picking assemblies are mounted for movement toward and away from the enclosure. The mounting mechanism for the picking assemblies includes a supporting framework extending transversely to the enclosure and generally perpendicular to its sides. The picking assemblies are movable on the supporting framework toward and away from the enclosure. When moved toward the enclosure, the picking assemblies extend through the side openings into an operative fowl picking position. When moved to a second position along the supporting framework, access is provided to the interior of the enclosure and the picking assemblies for service, cleaning and maintenance.

In a narrower aspect of the invention, the picking assemblies are supported on carriage members mounted on the supporting framework. The carriage members include vertical adjustment means for changing the relative spacing between the carriages and the picking assemblies whereby the position of the picking assemblies can be varied horizontally relative to the enclosure and the conveyor on which the poultry is suspended.

These and other objects, advantages, purposes and important features of the invention will become readily apparent to those skilled in the art from a study of the following description when considered in conjunction with the accompanying drawings.

DESCRIPTION OF THE PREFERRED EMBODIMENT

Figure 1:
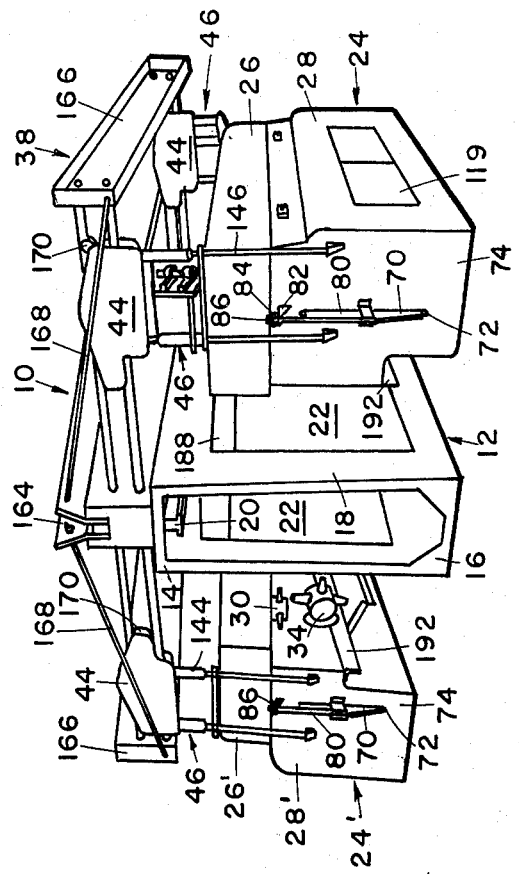
FIG. 1 is a perspective view illustrating a poultry processing apparatus incorporating the present invention.

Referring now to the drawings and in particular to FIGS. 1-3 and 6, the poultry processing apparatus of the invention generally designated by the numeral 10 includes a cabinet-like structure 12 having an upper or top wall 14, a base 16 forming a trough and opposed sidewalls 18 forming generally an elongated enclosure through which fowls are conveyed on a track 20 during processing operations. Access openings 22 are formed in sidewalls 18.

A pair of opposed picking assemblies 24 and 24' each comprising a vertically upstanding, generally horizontally, elongated housing having a top cabinet-like portion 26, a lower cabinet-like portion 28 which are positioned at the sides of enclosure 12 to extend through access openings 22 in sidewalls 18.

Each picking assembly 24 includes an upper picking mechanism 30 positioned in top cabinet 26 and having a plurality of picking fingers 32 rotatable in a horizontal plane. A lower picking assembly 34 positioned in lower cabinet 28 includes a plurality of picking fingers 36 rotatable in generally vertical planes.

An overhead track assembly 38 includes a spaced pair of rail members 40-42 which extend transversely to enclosure 12 generally perpendicular to sidewalls 18 and access openings 22 formed therein.

Figures 6, 7:
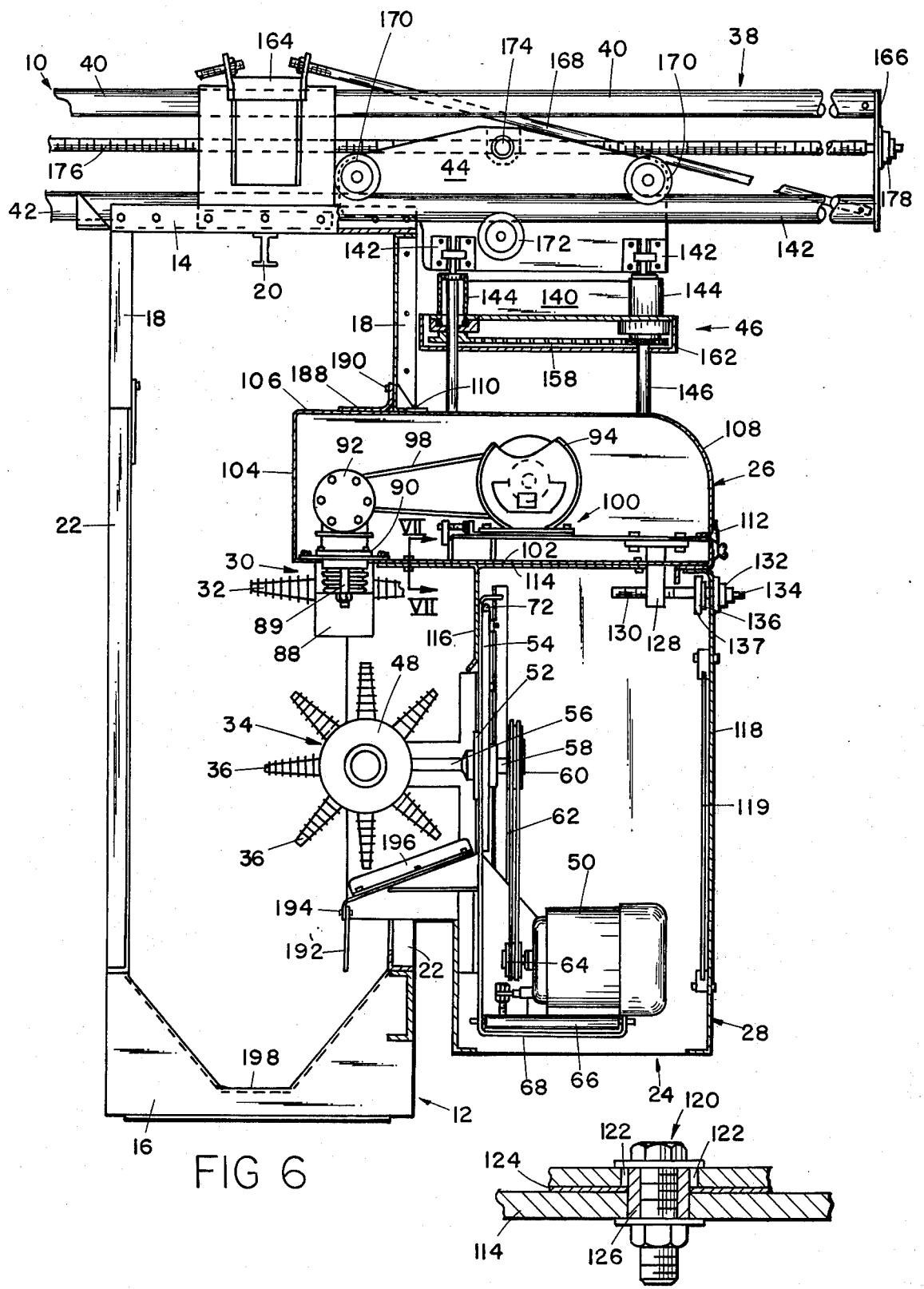
FIG. 6 is an enlarged fragmentary end elevation view similar to FIG. 2 illustrating the main framework and one of the picking assemblies in an operative position.
FIG. 7 is an enlarged fragmentary cross-sectional view taken along the plane VII—VII of FIG. 6.

A pair of carriage members 44 for each picking assembly 24 are slidably mounted on the overhead track assembly 38. The carriage members are positioned generally near at each end of enclosure 12 and include means to adjustably support the ends of the picking assemblies 24. Carriage members 44 support the picking assemblies 24 for transverse movement along the overhead track assembly 38 toward and away from enclosure 12. In this connection, it should be noted that in FIGS. 1 and 2, the picking assemblies 24 are illustrated in an access position, that is, moved away from enclosure 12. In FIG. 6, the picking assembly 24 is shifted toward and into enclosure 12 through access opening 22 into an operative position. Vertical adjustment means 46 associated with each carriage member 44 connect the carriage to the associated end portion of the picking assembly.

Figure 3:
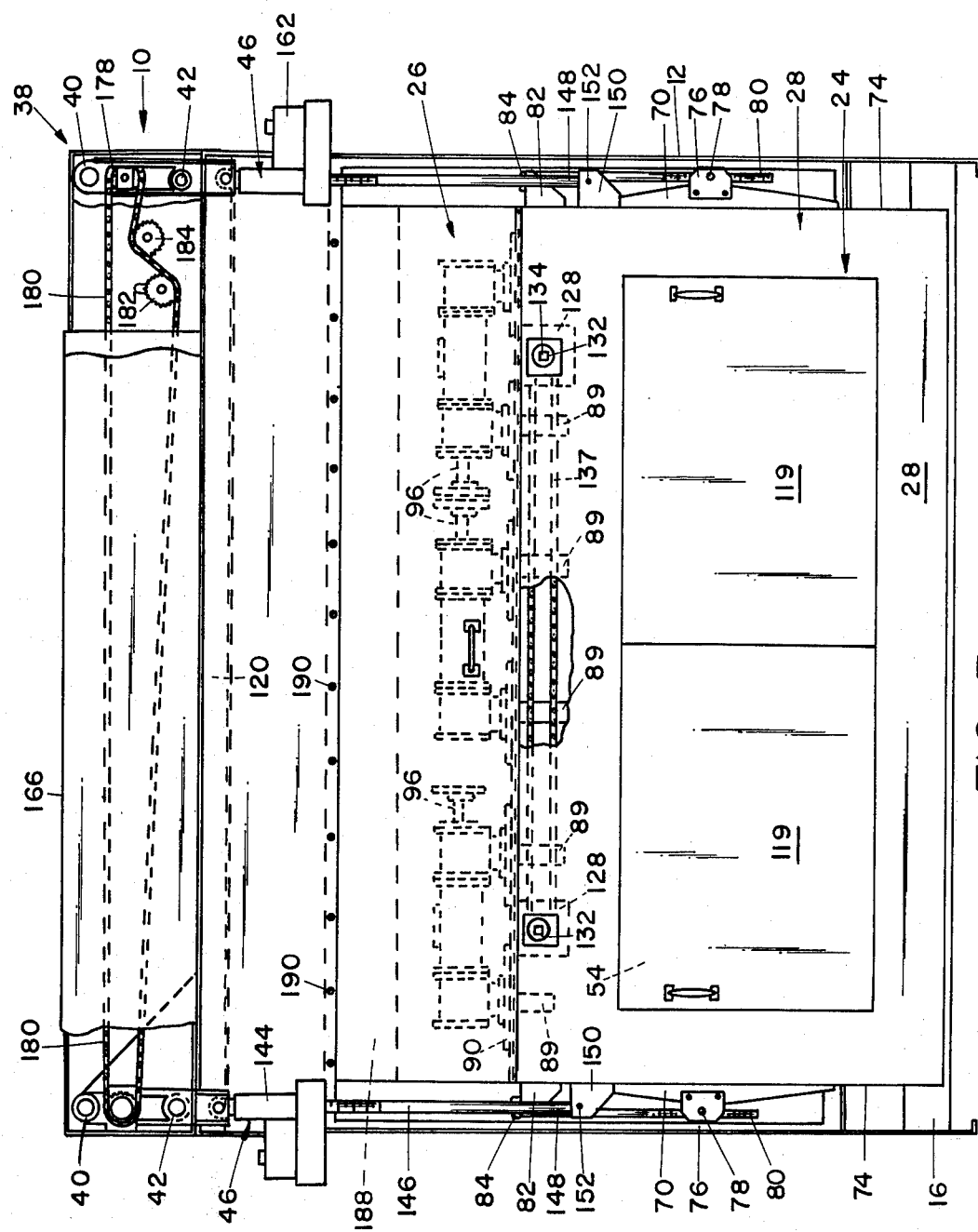
FIG. 3 is a side view of the apparatus shown in FIG. 2 with portions broken away from clarity.

Picking assembly 24 located on the right hand side of the apparatus as viewed in FIGS. 1, 3 and 6 and picking assmebly 24' located on the left side are substantially mirror images of one another. Similarly, the carriage members 44 and the opposite ends of the overhead track assembly 38 are substantially identical. Accordingly, the following detailed description, for convenience, will refer to and describe only one side of the apparatus. Those portions on the left corresponding to those on the right when specifically described being identified by the same reference numerals bearing the (') designation.

Figure 5:
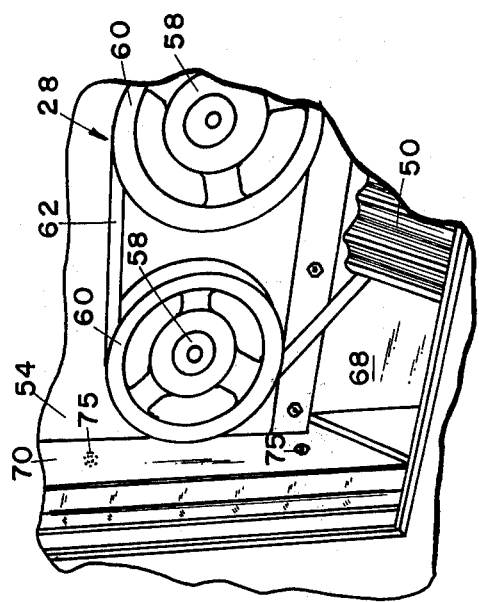
FIG. 5 is a fragmentary perspective view illustrating portions of the interior of the picking assembly to illustrate details of the vertical adjustment mechanism of FIG. 4.

Referring to FIG. 6, picking assembly 24, enclosure 12 and the overhead track assembly 38 will be described in somewhat greater detail. As outlined above, picking assembly 24 incudes the upper or top cabinet 26 and lower cabinet 28 in which the upper or horizontally driven picking mechanism 30 and the lower or vertically driven picking mechanism 34 are mounted, respectively. Lower picker mechanism 34 includes a plurality of individual axially aligned drum assemblies 48 (only one of which is shown). Each drum assembly 48 includes a pair of counter-rotating, axially aligned drums positioned immediately adjacent one another. Each drum 48 rotates in a plane generally transverse to the picking channel formed through the enclosure. The drums 48 each include a plurality of the previously mentioned radially extending, flexible, picking fingers 36. Drive means 50 are included for driving each pair of counter-rotating drums. Each drum assembly includes a support member 52 secured to a common mounting plate 54. Support member 52 carries a shaft housing 56 extending to a gear housing (not shown) supported within each drum. A shaft 58 extending through housing 56, support 52 and through mounting plate 54 has a pulley 60 (see also FIG. 5) fixed thereon which is connected to drive means 50 by means of drive belts 62. Drive belts 62 are connected to a corresponding pulley 64 fixed to the shaft of drive means 50. A plurality of such drum assemblies 48, support members 52 and drive means 50 are arranged along the length of mounting plate 54 for simultaneous operation. Drive means 50 is adjustably mounted on a bracket 66 pivotally connected on an outwardly extending flange 68 carried by mounting plate 54. For a more detailed description of the construction and operation of the counter-rotating drum assemblies 48 and the drive means therefor, reference may be had to the above identified, commonly assigned, copending application Ser. No. 493,023 incorporated herein by reference.

Mounting plate 54 extends along the length of lower cabinet 28 of picking assembly 24 and has end portions in the form of outwardly extending ears 70 which extend through an elongated vertical slot 72 formed in the end walls 74 of picking assembly 24.

Ears 70 are attached to the ends of mounting plate 54 by conventional fastening means 75 (FIG. 5) located within lower cabinet 28 of the picking assembly. At the outside of lower cabinet 28 a bracket 76 is fixed to the central portion of the outwardly extending parts of ears 70. Bracket 76 includes a pair of spaced wall members between which an adjusting nut 78 is captively held. Elongated adjusting screws 80 are threadably received at one end in the captive nut 78 at each side of picking assembly 24. The opposite ends of adjusting screws 80 extend upwardly toward the top of the lower cabinet and extend through brackets 82 welded to end walls 74 near the top of the lower cabinet. Adjusting screws 80 are fixed for rotation with respect to brackets 82 by a collar or bearing 84 held by bracket 82. The uppermost end 86 of each adjusting screw 80 is configured to receive a rachet (not shown) or other tool to effect rotation of the adjusting screws. Rotation of adjusting screw 80 causes captive nut 78 and the elements associated therewith including mounting plate 54 and the lower picking mechanism 34 to move vertically within the lower cabinet 28 as the mounting plate is moved up or down along the length of vertical slot 72.

The adjusting screws 80 on each side of the lower cabinet 28 of the picking assembly may be turned to vertically adjust the lower picking mechanism along generally the same vertical level or if desired, the adjusting screws 80 may be independently operated to selectively raise or lower one end of the lower picking mechanism relative to its other end such that the vertically driven pickers are inclined relative to the path of travel of the poultry being processed.

The upper cabinet 26 of the picking assembly 24 contains the upper picking mechanism 30 which, as it will be recalled, includes a plurality of picking fingers 32 rotatable in a generally horizontal direction. Upper picking mechanism 30 is of conventional construction and includes a plurality of drum members 88 (only one is shown) on which picking fingers 32 are attached. Drums 88 are each supported and driven by vertically positioned shafts 89 which extend upwardly through a mounting 90 and into a gear box 92. Preferably alternate drums (not shown) are driven in opposite directions along the length of the longitudinally extending channel through which the poultry is moved. A plurality of gear boxes 92 are positioned along the length of the upper cabinet 26 such that each pair of gear boxes is driven to cause counter-rotation of the alternate drums. Drive means 94 as an electric motor is connected to the input shaft 96 (FIG. 3) of each gear box 92 by means of a drive belt 98 (FIG. 6) for operation in a conventional manner. As shown in FIG. 3, the gear boxes are arranged in pairs each having one input shaft 96 and two vertical shafts 89 connected to drive drums 88. Operation of motor 94 through the gear box 92 causes the proper rotation of drums 88 and the picking fingers 32 mounted thereon. Motor 94 includes suitable adjustment means 100 within the upper cabinet 26 to adjust the tension on drive belt 98.

The upper cabinet includes a bottom wall or base plate 102 to which the shaft mounted 90, gear boxes 92 and motors 94 are mounted. The base plate forms the bottom wall of the upper cabinet which also includes an inner wall 104, a partial top wall 106 and a hinged cover 108. Cover 108 is fixed to partial top wall 106 by a hinge 110 and is secured adjacent base plate 102 by a latch 112.

Base plate 102 forming the lower portion of upper cabinet 26 is mounted for sliding movement with respect to an upper wall 114 of lower cabinet 28. Lower cabinet 28 includes, in addition to upper wall 114, an inner wall 116 (on which mounting plate 54 and the vertically driven picking assemblies extend) and an outer wall 118. Outer wall 118 is also provided with slidable access doors 119. Upper wall 114 extends between inner wall 116 and outer wall 118 and also extends a slight distance outwardly toward the center of the enclosure to form an elongated mounting surface for base plate 102 of upper cabinet 26.

With reference to FIG. 7, base plate 102 has elongated slots 122 formed therein to receive fastening means 120. A thin spacer member 124 is positioned between upper wall 114 and base plate 102 to provide a sliding surface. Spacer member 124 may be formed of thin metallic sheet material or a lubricious material as nylon to prevent binding as the upper cabinet 26 is moved with respect to the lower cabinet 28. Fastening means 120 typically may include a nut and bolt combination together with suitable flat and lock washers as required. A spacer element 126 surrounds the shank of the bolt and passes through slot 122 in base plate 102 and the corresponding opening in upper wall 114. The spacer serves to prevent the nut from being completely tightened on the bolt thus maintaining freedom for sliding movement between the upper and lower cabinets.

A pair of brackets 128 (FIGS. 2, 3, and 6) are secured at one end to bottom wall 102 of upper cabinet 26. The opposite end of the bracket depends downwardly into lower cabinet 28 through suitable openings provided in upper wall 114. The lower ends of brackets 128 are each equipped with a threaded portion adapted to engage with a corresponding pair of elongated threaded adjustment screws 130 carried by the lower cabinet. Adjustment screws 130 extend transversely to brackets 128 and extend outwardly through outer wall 118 where they are mounted for rotation in a bearing or collar 132. The bearing or collar 132 is of conventional construction and may include bearings and suitable grease fittings. Bearing 132 allows rotation of adjustment screw 130 while preventing lateral movement. The outer end 134 of screw 130 is configured to receive a rachet, a hand wheel or other suitable tool (not shown) to effect rotation of adjusting screw 130. A sprocket 136 is fixed to each adjusting screw 130 in the interior of the lower cabinet. Sprockets 136 are connected to each other by a chain 137 or other suitable positive drive mechanism such that rotation of adjusting screw 130 at one side of the lower cabinet will cause a corresponding rotation of the adjusting screw at the other side. The adjusting screw on either side of the cabinet may be turned to laterally adjust the relative position of the upper cabinet with respect to the lower cabinet as base plate 102 slides relative to upper wall 114. As a result, the horizontally driven upper picking mechanism 30 in the upper cabinet are moved toward or away from the path of travel of the poultry being processed. The slotted portions of the adjoining base plate 102 and wall 114 in cooperation with wall adjusting screws 130 thereby provide for movement of the horizontally rotatable upper picking mechanism transversely to the vertically rotatable lower picking mechanism 34 such that the vertical alignment of the vertical shafts 89 supporting the upper picking mechanisms are moved transversely with respect to the horizontal axis of the lower picking mechanism.

Figure 4:
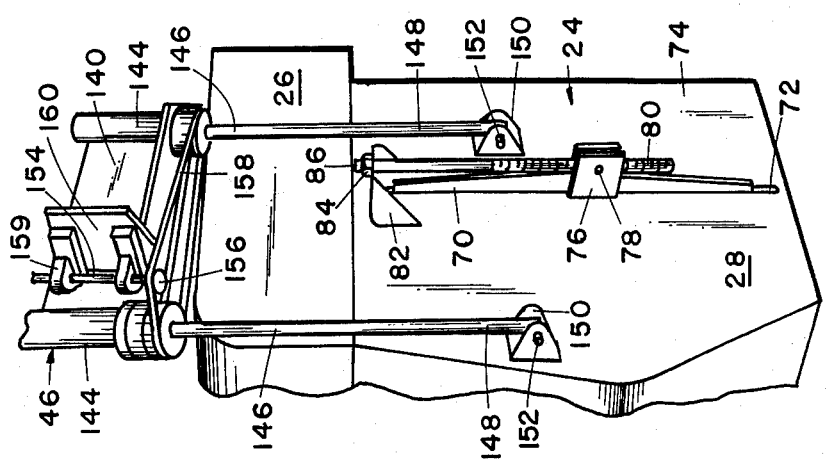
FIG. 4 is a fragmentary perspective view illustrating portions of the vertical adjustment mechanism for the picking assemblies.

With additional reference to FIG. 4, the vertical adjustment means 46 connecting each picking assembly 24 to the overhead carriage members 44 will be described in greater detail. As mentioned previously, each picking assembly 24 and 24' including the upper and lower cabinets in which the horizontally and vertically rotatable picking elements are contained are movable vertically with respect to enclosure 12.

Vertical adjustment means 46 include a housing 140 suspended by mounting brackets 142 on carriage members 44. Each housing 140 contains a pair of threaded rotatable jack screw assemblied 144 each of which receive an elongated threaded adjustment rod 146. Adjustment rod 146 extends downwardly from jack assembly 144 and at its lowermost end 148 is pivotally connected by a bracket 150 to end walls 74 of the lower cabinet of picking assembly 24. Bracket 150 includes a pair of parallel wall members welded or otherwise fixed to sidewalls 74. The brackets extend outwardly a slight distance from walls 74 where a pin member 152 is passed through the brackets and lower end 148 of adjustment rod 146. The upper end of adjustment rod 146 is threaded and extend through the jack assembly 144 such that rotation of the jack assembly in a conventional manner causes adjustment rod 146 to raise and lower the entire picking assembly 24. The jack assemblies 144 in each housing 14 positioned at the ends of the enclosure are connected to each other by a drive chain 158 such that rotation of one of the jack assemblies causes a corresponding rotation of the other, thus causing both adjustment rods at one end of the picking assembly to raise or lower at the same rate. To effect rotation of jack screw assemblies 144, a drive mechanism including a shaft 154 (FIG. 4) having a fixed sprocket 156 engages chain 158. Shaft 154 mounted for rotation in pillow blocks 159 fixes to an outwardly extending portion 160 of housing 140. The upper end (not shown) of shaft 154 is configured to accept a rachet, a hand wheel or similar tool (not shown) to effect rotation thus to raise or lower picking assembly 24. A cover 162 (FIGS. 2 and 3) encloses the chain and drive mechanisms.

The opposed picking assemblies 24—24' supported by carriage members 44 and the adjustment mechanisms 46 positioned thereon are mounted on the overhead track assembly 38. The overhead track assembly includes the previously mentioned spaced upper and lower rail members 40 and 42 which extend transversely to enclosure 12 generally perpendicular to the side walls 18.

The upper rail 40 and lower rail 42 on each side of enclosure 12 are supported in a mount 164 positioned on upper wall 14. Lower rails 42 serve as the guide for carriage members 44 as will be hereinafter described. Upper rail 40 extends parallel to lower rail 42 and each of the rails are tied at their outermost ends to cross members 166. Cross members 166, as best illustrated in FIG. 1, extend along the length of enclosure 12 and the ends of the upper and lower rails are secured thereto in any convenient manner. A plurality of diagonally disposed brace members 168 are secured at one end to an upper portion of mount 164 and at their opposite ends to cross members 166 to add rigidity and to stabilize the rail members. Lower rail 42 preferably has a circular cross section to receive a pair of upper wheels 170 and a lower guide wheel 172 for each carriage member 44. The carriage member is somewhat triangular in configuration, the lower portion carrying the mounting mechanisms by which the vertical adjustment means 46 is supported. The apex of the carriage member supports a captive adjustment nut 174. The adjustment nut 174 on one side of the enclosure is equipped with a right hand thread while the adjustment nut 174' on the opposite side is equipped with a left hand thread. Extending between cross members 166 through the carriage members is an elongated lead screw 176 which is threaded along its length and received in the captive adjustment nuts 174. The ends of lead screw 176 are mounted for rotation but prevented from moving axially in bearing elements 178 fixed in cross members 166.

With reference to FIG. 3, it will be recalled that a pair of carriage members are positioned for operative connection through the vertical adjustment means 46 to each end of the picking assembly 24. The pairs of rail members 40 and 42 are positioned at each side of the enclosure to support the carriage members 44. A sprocket 178 is secured near one end of each of the lead screws 176 and is rotatable therewith. A chain 180 connects sprockets 178 at each side of overhead track assembly 38. The chain passes over an idler sprocket 182 and a drive sprocket 184. Drive sprocket 184 is operatively connected to a motor 186 through suitable gear mechanisms 187 to cause rotation of sprocket 184 and the resultant movement of the chain to turn both lead screws 176. Rotation of screws 176 will, of course, by virtue of the left hand and right hand adjustment nuts 174 and 174' positioned in the carriage members, cause the carriages to simultaneously move toward or away from enclosure 12.

Figure 2:
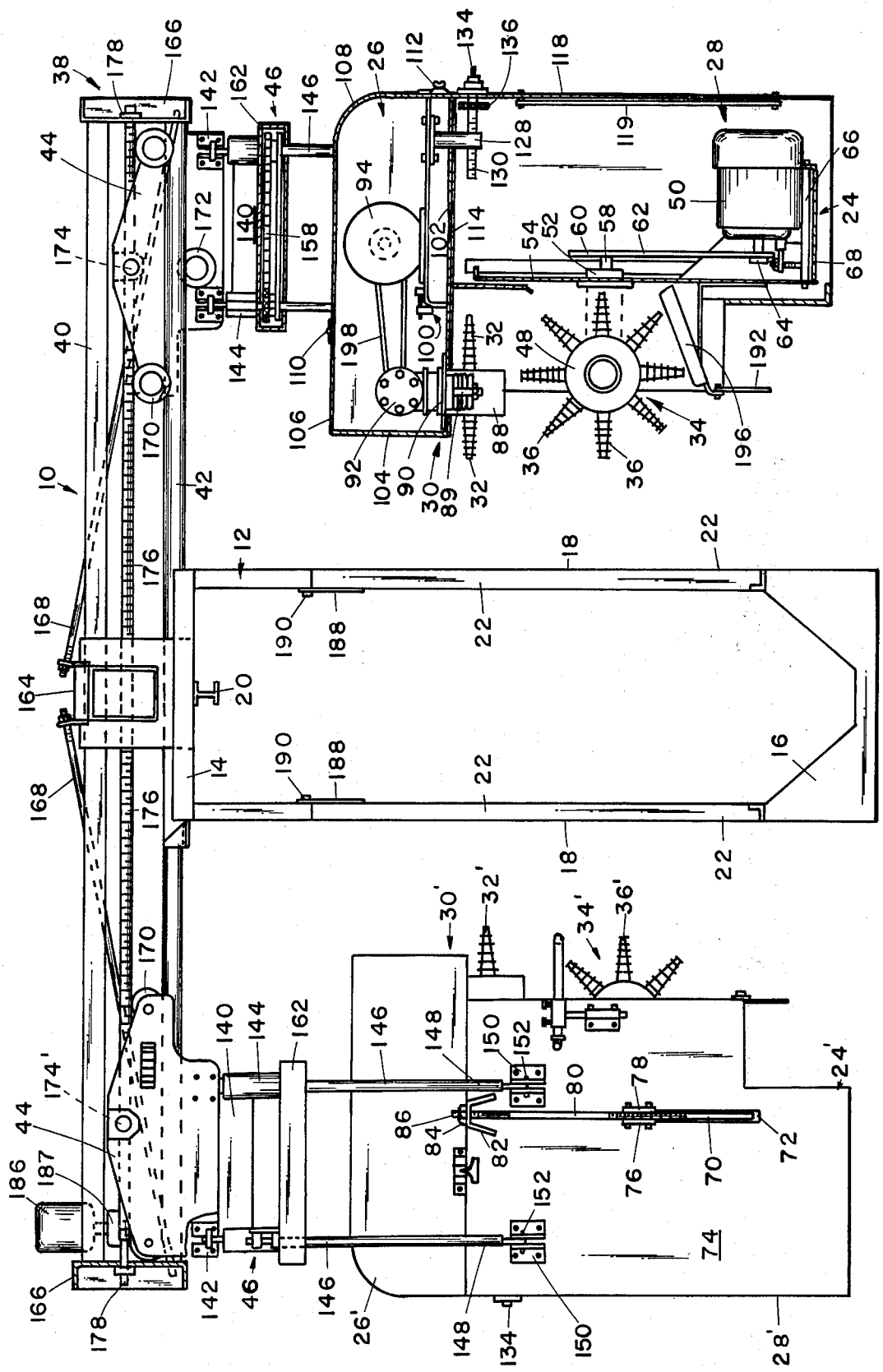
FIG. 2 is an end elevation view partially in cross section of the poultry processing apparatus shown in FIG. 1.

In the outermost position of the carriages and picking assemblies as shown in FIG. 2, access may be had to the horizontal and vertical drums, the picking fingers mounted thereon, the interior of the enclosure 12 and the components contained therein for service, cleaning and the like.

As motor 186 is energized causing rotation of lead screw 176, the carriage members 44 are moved toward each other causing the picking assemblies 24 and 24' to assume the position shown in FIG. 6.

To retain water, feathers and the like in enclosure 12, sealing means as an elongated flexible flap member 188 extends along the upper margin of access opening 22 in sidewall 18. Flap 188 is secured by screws 190 spaced along the upper margin of opening 22. When the picking assemblies are positioned in the cabinet as illustrated in FIG. 6, flap 188, because of its resilient and flexible nature contacts partial top wall 106 of the upper cabinet 26 to form a seal. The lower cabinet 28 of picking assembly 24 is similarly sealed with respect to enclosure 12 by an elongated flap 192 extending along and fixed to a lower edge portion of the lower cabinet 28. Flap is similarly secured by screws 194 which are attached to a downwardly depending elongated flange 196 secured to inner wall 116. Flange 196 slopes downwardly to direct water, feathers and the like into a lower trough 198 formed in the base portion 16 of enclosure 12. It will be noted that as the mounting plate 54 is moved up or down vertically, flap 192 will serve effectively to prevent water, feathers and the like from exiting through access opening 22 at the lower portion of the enclosure 12. When mounting plate 54 or the entire picking assembly 24 is in its lowermost position, flap 192 may contact the sidewalls of trough 198. When in an upper position, the length of flap 192 is in excess of the maximum exposed portion of opening 22 to thereby retain such materials within the enclosure.

In view of the above, those skilled in the art will immediately recognize that the present invention is a significant improvement over prior poultry processing devices. By virtue of the support structure for the oppositely directed picking assemblies the picking assemblies may be easily retracted from the main enclosure for service, cleaning and other maintenence operations. The support structure may also be used for longitudinally adjusting the picking assemblies with respect to each other to accommodate fowls of varying size. Each picking assembly additionally include means for adjusting the ends thereof to vary the height of the picking assembly with respect to the overhead conveyor or other support for the poultry to be picked. In addition, the upper picking mechanism may be adjusted with respect to the lower picking mechanism in a vertical direction by shifting the upper cabinet transversely with respect to the lower cabinet. Another feature resides in the adjustment mechanisms for vertically shifting the lower picking mechanism with respect to the upper picking mechanism. Finally, one end of the upper picking mechanism or the lower picking mechanism may be adjusted to different vertical positions with respect to the enclosure and to each other such that the upper, lower or both picking means are inclined relative to the path of travel of the poultry being processed.

Obviously many modifications and variations of the present invention are possible in the light of the above teachings and it will be apparent to those skilled in the art that various changes in form and arrangement of components may be made to suit requirements without departing from the spirit and the scope of this invention. Therefore, it will be understood that the embodiment shown in the drawings and described above is merely for illustrative purposes and is not intended to limit the scope of the invention which is defined by the claims which follow.

The embodiments of the invention in which an exclusive property or privilege is claimed are defined as follows:

1. Apparatus for picking fowls as they are conveyed along a predetermined path of travel comprising:
   means forming an elongated enclosure through which the fowls are conveyed during the picking operation, said enclosure being opened at the ends thereof to allow the passage of fowls therethrough and having openings formed in the sides thereof;
   a pair of opposed picking assemlies positionable at the sides of said enclosure to extend into said openings, said picking assemblies each including a plurality of finger elements adapted to engage the fowls to remove the feathers therefrom;
   an overhead supporting framework extending transversely to said elongated enclosure generally perpendicular to the sides thereof; and carriage means mounting said picking assemblies on said supporting framework for movement toward and away from said enclosure means, said picking assemblies when moved toward said enclosure means extending through said side openings into cooperative operative picking positions and when moved in a second position along said supporting framework providing access to the interior of said enclosure and said picking assemblies.

2. The apparatus of claim 1 wherein said carriage means includes at least a pair of carriage members mounted on said supporting framework, one on each side of said enclosure for movement along said supporting framework toward and away from said enclosure; and further including means connecting said picking assemblies to said carriage means for movement therewith.

3. The apparatus of claim 2 wherein said connecting means includes means for adjusting the relative spacing between said carriage members and said picking assemblies whereby the horizontal position of said picking assemblies can be adjusted relative to said path of travel.

4. The apparatus of claim 3 wherein a pair of said carriage means are provided for each said picking assembly, said carriage means being positioned adjacent the ends of said picking assemblies, each said carriage means including said connecting means whereby one end of said picking assemblies may be adjusted to a different vertical position with respect to its other end such that said picking means is inclined relative to said path of travel.

5. The apparatus of claim 1 wherein each of said opposed picking assemblies includes a housing member having an upper portion and a lower portion, said picking elements being independently mounted in each said portion, said picking elements in said upper portion being mounted for movement about a first axis; and said picking elements in said lower portion being mounted for movement about a second axis.

6. The apparatus of claim 5 and further including means mounted said upper portion for movement transversely to said lower portion.

7. The apparatus of claim 6 and further including adjustable mounting means supporting said picking elements in said lower portion, said mounting means being shiftable vertically in said lower portion to thereby vary the vertical spacing between said picking elements on said upper portion and said picking elements on said lower portion.

8. The apparatus of claim 5 and further including adjustable mounting means supporting said picking elements in said lower portion, said mounting means being shiftable vertically in said lower portion, to thereby vary the vertical spacing between said picking elements on said upper portion and said picking elements on said lower portion.

9. A fowl picking machine comprising:
an elongated main framework forming an enclosure defining a generally horizontally and longitudinally extending picking channel through which fowls are movable for picking and cleaning feathers from the same, said enclosure having openings formed in the sides thereof;
a pair of spaced longitudinally extending picking assemblies positionable to extend into said openings in said enclosure to define the boundaries of said channel;
support means extending transversely to said channel for supporting said picking assemblies on each side of said enclosure;
carriage means on said picking assemblies and said support means supporting said picking assemblies for lateral movement with respect to each other and to said enclosure.
means connected to said carriage means for moving same and said picking assemblies associated therewith laterally toward and away from said enclosure whereby in a first position said picking assemblies are positioned relative each other within said enclosure to remove feathers from the fowls and in a second position away from said enclosure to allow access to th interior of said enclosure and said picking assemblies.

10. The picking machine of claim 9 and further including first and second picking means in said picking assembly, said first picking means including a plurality of aligned drum assemblies having picking fingers mounted thereon for rotation in a generally vertical direction with respect to said channel, said second picking means including a plurality of drum members each having picking fingers mounted thereon for rotation in a generally horizontal direction with respect to said channel; and
means for adjusting the relative position of said first and said second picking means with respect to each other.

11. The apparatus of claim 10 and further including adjustment means positioned between said carriage means and said picking assemblies for vertically adjusting said picking assemblies relative said channel.

12. The apparatus of claim 10 wherein said means for adjusting the relative position of said first and said second picking means includes first adjusting means for shifting one of said first and said second picking means vertically relative to the other of said first and said second picking means.

13. The apparatus of claim 12 and further including second adjusting means for shifting the other of said first and second picking means laterally relative to said one of said first and second picking means.

14. The apparatus of claim 12 wherein said first picking means is vertically shiftable.

15. The apparatus of claim 12 wherein said second picking means is laterally shiftable.

16. Apparatus for picking fowls as they are conveyed along a predetermined path of travel comprising:
means forming an elongated enclosure through which the fowls are conveyed during processing operations, said enclosure means being opened at the ends thereof to allow the passage of fowls therethrough and having openings formed in the sides thereof;
a pair of opposed picking assemblies positionable at the sides of said enclosure means to extend through said openings, said picking assemblies each including a plurality of finger elements adapted to engage the fowls to remove the feathers therefrom;
means mounting said picking assemblies for movement toward and away from said enclosure means, said mounting means including an overhead supporting framework extending transversely to said elongated enclosure generally perpendicular to the sides thereof;
at least a pair of carriage members mounted on said supporting framework, one on each side of said enclosure means for movement along said supporting framework toward and away from said enclosure means;

means connecting said picking assemblies to said carriage means for movement therewith whereby said picking assemblies are movable toward and away from said enclosure means, said picking assemblies when moved toward said enclosure means extending through said side openings into cooperative operative picking positions and when moved in a second position along said supporting framework, providing access to the interior of said enclosure and said picking assemblies.

17. The apparatus of claim 16 wherein said connecting means includes means for adjusting the relative spacing between said carriage members and said picking assemblies whereby the horizontal position of said picking means can be adjusted relative to said path of travel.

18. The apparatus of claim 17 wherein a pair of said carriage means are provided for each said picking assembly, said carriage means being positioned adjacent the ends of said picking assemblies, each said carriage means including said connecting means whereby one end of each said picking assembly may be adjusted to a different vertical position with respect to its other end such that said picking assembly is inclined relative to said path of travel.

19. The apparatus of claim 17 wherein each of said opposed picking assemblies includes a housing member having an upper portion and a lower portion, said picking elements being independently mounted in each said portion, said picking elements in said upper portion being mounted for rotation about a vertical axis such that said picking elements rotate in a horizontal plane, the picking elements in said lower portion being mounted for rotation about a horizontal axis to rotate in a vertical plane.

20. The apparatus of claim 19 and further including means mounting said upper portion and said horizontally rotatable picking elements for movement transversely to said lower portion and said vertically rotating picking elements whereby said vertical axis can be moved transversely with respect to said horizontal axis.

21. The apparatus of claim 20 and further including adjustable mounting means in said lower portion supporting said picking elements for rotation about said horizontal axis, said mounting means being shiftable vertically in said lower portion to thereby vary the vertical spacing between said picking elements on said upper portion and said picking elements on said lower portion.

22. The apparatus of claim 19 and further including adjustable mounting means in said lower portion supporting said picking elements for rotation about said horizontal axis, said mounting means being shiftable vertically in said lower portion to thereby vary the vertical spacing between said picking elements on said upper portion and said picking elements on said lower portion.

* * * * *